(12) United States Patent
Hsieh et al.

(10) Patent No.: US 9,897,907 B2
(45) Date of Patent: Feb. 20, 2018

(54) ILLUMINATION SYSTEM AND PROJECTION APPARATUS

(71) Applicants: Chi-Tang Hsieh, Hsin-Chu (TW);
Ko-Shun Chen, Hsin-Chu (TW);
Chi-Hsun Wang, Hsin-Chu (TW);
Hao-Wei Chiu, Hsin-Chu (TW);
Hou-Sheng Wang, Hsin-Chu (TW)

(72) Inventors: Chi-Tang Hsieh, Hsin-Chu (TW);
Ko-Shun Chen, Hsin-Chu (TW);
Chi-Hsun Wang, Hsin-Chu (TW);
Hao-Wei Chiu, Hsin-Chu (TW);
Hou-Sheng Wang, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 86 days.

(21) Appl. No.: 14/527,775

(22) Filed: Oct. 30, 2014

(65) Prior Publication Data
US 2015/0316775 A1 Nov. 5, 2015

(30) Foreign Application Priority Data
May 2, 2014 (TW) .............................. 103115820 A

(51) Int. Cl.
*G02B 27/10* (2006.01)
*G03B 21/20* (2006.01)
*G03B 33/08* (2006.01)

(52) U.S. Cl.
CPC ......... *G03B 33/08* (2013.01); *G02B 27/1006* (2013.01); *G03B 21/204* (2013.01); *G03B 21/2013* (2013.01); *G03B 21/2033* (2013.01)

(58) Field of Classification Search
CPC ............ G03B 21/2033; G03B 21/2013; G03B 21/204; G03B 21/2066; H04N 9/3164;
(Continued)

(56) References Cited

U.S. PATENT DOCUMENTS

| 5,580,142 A | 12/1996 | Kurematsu |
| 8,469,520 B2 | 6/2013 | Maeda |

(Continued)

FOREIGN PATENT DOCUMENTS

| CN | 101937127 | 1/2011 |
| CN | 101937161 | 1/2011 |

(Continued)

*Primary Examiner* — Christina Riddle
*Assistant Examiner* — Christopher Lamb, II
(74) *Attorney, Agent, or Firm* — JCIPRNET

(57) ABSTRACT

An illumination system includes a coherent light source, a first light-combining element, an optical wavelength conversion module, and a first auxiliary light source. The coherent light source emits a coherent light beam. The first light-combining element is disposed on a transmission path of the coherent light beam. The light wavelength conversion module is disposed on a transmission path of the coherent light beam transmitted from the first light-combining element and converts the coherent light beam into a first converted light beam, and reflects the first converted light beam back to the first light-combining element. The first auxiliary light source emits a first auxiliary light beam which is transmitted to the first light-combining element along the transmission path of the coherent light beam. The first light-combining element combines the first auxiliary light beam and the first converted light beam. A projection apparatus is also provided.

15 Claims, 5 Drawing Sheets

(58) Field of Classification Search
CPC .. H04N 9/3114; H04N 9/3111; H04N 9/3117;
H04N 9/3158; H04N 9/3161; G02B
26/008; G02B 27/1006
USPC .................................................... 362/84, 231
See application file for complete search history.

(56) References Cited

U.S. PATENT DOCUMENTS

| | | | |
|---|---|---|---|
| 2010/0328554 A1* | 12/2010 | Shibasaki | H04N 9/3161 348/760 |
| 2010/0328626 A1* | 12/2010 | Miyazaki | H04N 9/3114 353/85 |
| 2011/0043764 A1* | 2/2011 | Narikawa | G03B 21/204 353/31 |
| 2011/0205502 A1* | 8/2011 | Kato | G03B 21/14 353/84 |
| 2013/0083509 A1 | 4/2013 | Ko | |
| 2013/0100417 A1* | 4/2013 | Yang | G03B 21/204 353/31 |
| 2014/0071407 A1* | 3/2014 | Takahashi | G03B 21/142 353/31 |
| 2014/0211169 A1* | 7/2014 | Kitano | G03B 21/204 353/31 |
| 2015/0023012 A1* | 1/2015 | Yang | G02B 27/102 362/231 |
| 2015/0167907 A1* | 6/2015 | Hoehmann | G03B 21/204 362/84 |
| 2015/0253653 A1* | 9/2015 | Fujita | H04N 9/3111 353/31 |

FOREIGN PATENT DOCUMENTS

| | | | | |
|---|---|---|---|---|
| CN | 101995750 | | 3/2011 | |
| CN | 102520569 | | 6/2012 | |
| CN | 101937165 | | 9/2012 | |
| CN | 102722073 | | 10/2012 | |
| CN | 102722075 | | 10/2012 | |
| CN | 103062672 | | 4/2013 | |
| CN | 203217230 | | 9/2013 | |
| JP | 2004341105 | | 12/2004 | |
| KR | 20130024564 | | 3/2013 | |
| TW | 201307756 | | 2/2013 | |
| TW | 103062672 | | 4/2013 | |
| TW | 201335691 | | 9/2013 | |
| TW | 201405048 | | 2/2014 | |
| WO | WO 2013056594 A1 * | 4/2013 | ........... G02B 27/102 |
| WO | WO 2014006206 A1 * | 1/2014 | ........... G03B 21/204 |
| WO | WO 2014046219 A1 * | 3/2014 | ........... H04N 9/3111 |

* cited by examiner

ILLUMINATION SYSTEM AND PROJECTION APPARATUS

CROSS-REFERENCE TO RELATED APPLICATION

This application claims the priority benefit of Taiwan application serial no. 103115820, filed on May 2, 2014. The entirety of the above-mentioned patent application is hereby incorporated by reference herein and made a part of this specification.

BACKGROUND OF THE INVENTION

Field of the Invention

The invention relates to an optical system and a display apparatus. More particularly, the invention relates to an illumination system and a projection apparatus.

Description of Related Art

With advances in display technology, there are a variety of display devices available for users to choose, such as liquid crystal displays, organic light-emitting diode (OLED) displays and projection devices. Since projection devices may produce larger images in smaller sizes, some applications thereof can not be replaced, such as presentations used for conference meeting, home theaters, classroom education or research, and so forth, in which people participate.

In recent years, projection devices equipped with light-emitting diodes (LEDs) or laser diodes as a solid-state light source gradually dominate the market, wherein the laser diodes gain much attention for its higher luminous efficiency. The projection devices equipped with laser diodes as a solid-state light source produce desired pure lights by exciting phosphors by the laser light emitted from a light source, and using a color wheel to achieve sequential displays and a purpose of enhancing purity of the desired color light.

Although laser diodes have higher luminous efficiency, such projection devices still face an issue of parts of color lights having insufficient brightness. In the prior art, brightness of color lights is enhanced primarily by adjusting compositions of phosphor materials; however, this method is not adapted for adjusting brightness of particular color lights. In addition, there are different methods for controlling light-emitting ratios of different color lights by adjusting areas of corresponding colors on the color wheel; however, this method may lead to other issues. Take red light as an example, red phosphor is rarely used as an excited material due to its poor reliability (low tolerance and poor conversion efficiency). Therefore, the red light is usually obtained by arranging phosphor capable of exciting yellow light in coordination with a red filtering sheet on the color wheel and allowing the excited yellow light to pass through the red filtering sheet. However, the red filtering sheet would filter out portions of the red light having wavelength with the yellow band. Consequently, such approach could not effectively enhance brightness of the red light. On another aspect, if an area of the red filtering sheet on the color wheel is adjusted for enhancing brightness of the red light, areas of other colored filtering sheets have to be inevitably adjusted. When the areas are not adjusted properly, the display devices may have issues of color shifts or insufficient brightness of parts of the color lights. Accordingly, how to effectively enhance brightness of different color lights and avoid color shifts have become one of urgent issues to be solved by researchers nowadays.

China Patent No. 103062672 discloses a projection apparatus provided with phosphors in different colors and color wheels to achieve full color. U.S. Pat. No. 8,469,520 discloses a projection apparatus for enhancing color rendering property by arranging reference light sources in different colors. U.S. Patent Publication No. 20130083509 discloses a projection apparatus for enhancing brightness of each color light by arranging reference light sources with different colors.

SUMMARY OF THE INVENTION

The invention provides an illumination system having a superior brightness.

The invention further provides a projection apparatus employing the illumination system and is capable of enhancing brightness of color lights.

Other objects and advantages of the invention may be further understood by the technical features disclosed in the invention.

In order to achieve one or a portion of or all of the objects or other objects, an embodiment of the invention provides an illumination system including a coherent light source, a first light-combining element, an optical wavelength conversion module, and a first auxiliary light source. The coherent light source is adapted to emit a coherent light beam. The first light-combining element is disposed on a transmission path of the coherent light beam. The optical wavelength conversion module is disposed on the transmission path of the coherent light beam from the first light-combining element, and the first light-combining element is located between the coherent light source and the optical wavelength conversion module. The optical wavelength conversion module converts the coherent light beam into a first converted light beam, and reflects the first converted light beam back to the first light-combining element. A wavelength of the first converted light beam is different from a wavelength of the coherent light beam. The first auxiliary light source is adapted to emit a first auxiliary light beam. A wavelength of the first auxiliary light beam is different from the wavelength of the coherent light beam, wherein the first auxiliary light beam is transmitted to the first light-combining element along the transmission path of the coherent light beam. The first light-combining element combines the first auxiliary light beam and the first converted light beam reflected from the optical wavelength conversion module.

In an embodiment of the invention, the optical wavelength conversion module includes a light passing-through area and a first wavelength conversion area. The light passing-through area and the first wavelength conversion area cut into the transmission path of the coherent light beam. When the coherent light beam irradiates the light passing-through area, the coherent light beam passes through the light passing-through area. When the coherent light beam irradiates the first wavelength conversion area, the first wavelength conversion area converts the coherent light beam into a first converted light beam. The illumination system further includes a light transmission module disposed on the transmission path of the coherent light beam passing through the optical wavelength conversion module to transmit the coherent light beam from the light passing-through area back to the first light-combining element.

In an embodiment of the invention, the illumination system further includes a filtering module disposed on the transmission paths of the first converted light beam, the first auxiliary light beam, and the coherent light beam transmitted from the first light-combining element. The filtering module includes a light pervious area and a first filtering area. The light pervious area cuts into the transmission path of the coherent light beam passing through the light passing-through area corresponding to the light passing-through area of the optical wavelength conversion module, and the coherent light beam passes through the light pervious area. The first filtering area cuts into the transmission paths of the first converted light beam and the first auxiliary light beam corresponding to the first wavelength conversion area of the optical wavelength conversion module, wherein the first filtering area filters the first converted light beam and the first auxiliary light beam to generate a first light beam. A light wavelength spectrum range of the first light beam is narrower than a light wavelength spectrum range of the first converted light beam.

In an embodiment of the invention, the illumination system further includes a second light-combining element disposed on the transmission path of the first auxiliary light beam and the transmission path of the coherent light beam transmitted from the optical wavelength conversion module, and the second light-combining element is disposed between the first auxiliary light source and the first light-combining element, wherein the coherent light beam from the light passing-through area is transmitted to the first light-combining element through the light transmission module and the second light-combining element, and the first auxiliary light beam is transmitted to the first light-combining element along the transmission path of the coherent light beam from the light passing-through area.

In an embodiment of the invention, the illumination system further includes a second auxiliary light source and a third light-combining element. The second auxiliary light source is adapted to emit a second auxiliary light beam, wherein a wavelength of the second auxiliary light beam is different from the wavelengths of the coherent light beam and the first auxiliary light beam. The third light-combining element is disposed on the transmission paths of the first auxiliary light beam and the second auxiliary light beam, and the third light-combining element is disposed between the second auxiliary light source and the first light-combining element, wherein the first auxiliary light beam from the first auxiliary light source and the second auxiliary light beam from the second auxiliary light source are transmitted to the first light-combining element through the third light-combining element and the second light-combining element, and the first auxiliary light beam and the second auxiliary light beam are transmitted to the first light-combining element along the transmission path of the coherent light beam from the light passing-through area of the optical wavelength conversion module.

In an embodiment of the invention, the optical wavelength conversion module further includes a second wavelength conversion area. The light passing-through area, the first wavelength conversion area, and the second wavelength conversion area cut into the transmission path of the coherent light beam in turn. When the coherent light beam irradiates the second wavelength conversion area, the second wavelength conversion area converts the coherent light beam into a second converted light beam and reflects the second converted light beam back to the first light-combining element, wherein a wavelength of the second converted light beam is different from the wavelength of the coherent light beam, and a light wavelength spectrum range of the second auxiliary light beam is at least partially overlapped with a light wavelength spectrum range of the second converted light beam.

In an embodiment of the invention, the second auxiliary light source includes at least one light emitting diode (LED) or at least one laser diode.

In an embodiment of the invention, the first auxiliary light beam is transmitted to the first light-combining element along the transmission path of the coherent light beam emitted from the coherent light source.

In an embodiment of the invention, a light wavelength spectrum range of the first auxiliary light beam is at least partially overlapped with a light wavelength spectrum range of the first converted light beam, or the light wavelength spectrum range of the first auxiliary light beam is not overlapped with the light wavelength spectrum range of the first converted light beam.

In an embodiment of the invention, the first auxiliary light source includes at least one light emitting diode (LED) or at least one laser diode.

In an embodiment of the invention, the illumination system further includes a second auxiliary light source. The second auxiliary light source is adapted to emit a second auxiliary light beam. A wavelength of the second auxiliary light beam is different from the wavelengths of the coherent light beam and the first auxiliary light beam. The second auxiliary light beam is transmitted to the first light-combining element along the transmission paths of the coherent light beam and the first auxiliary light beam, and the first light-combining element combines the first auxiliary light beam, the second auxiliary light beam, and the first converted light beam reflected from the optical wavelength conversion module.

An embodiment of the invention further provides a projection apparatus including the illumination system, a light valve, and a projection lens. The light valve is disposed on a transmission path of an illumination beam from the illumination system to convert the illumination beam into an image light beam, wherein the illumination beam is formed from the first converted light beam and the first auxiliary light beam. The projection lens is disposed on a transmission path of the image beam.

In an embodiment of the invention, the optical wavelength conversion module includes a light passing-through area and a first wavelength conversion area. The light passing-through area and the first wavelength conversion area cut into the transmission path of the coherent light beam in turn. When the coherent light beam irradiates the light passing-through area, the coherent light beam passes through the light passing-through area. When the coherent light beam irradiates the first wavelength conversion area, the first wavelength conversion area converts the coherent light beam into a first converted light beam. The illumination system further includes a light transmission module disposed on the transmission path of the coherent light beam passing through the optical wavelength conversion module to transmit the coherent light beam from the light passing-through area back to the first light-combining element. The illumination beam is further formed from the coherent light beam.

In view of the above, the illumination system of the embodiment of the invention enhances purity and brightness of color lights by arranging the first auxiliary light source. Accordingly, the illumination system of the embodiment and the projection apparatus employing the illumination system of the invention has superior brightness. In addition, since the above embodiments of the invention enhance brightness of specific colors without adjusting an area ratio of each color in the optical wavelength conversion module, color shifts or insufficient brightness of partial colors may be avoided.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that both the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the invention.

Figure 1:
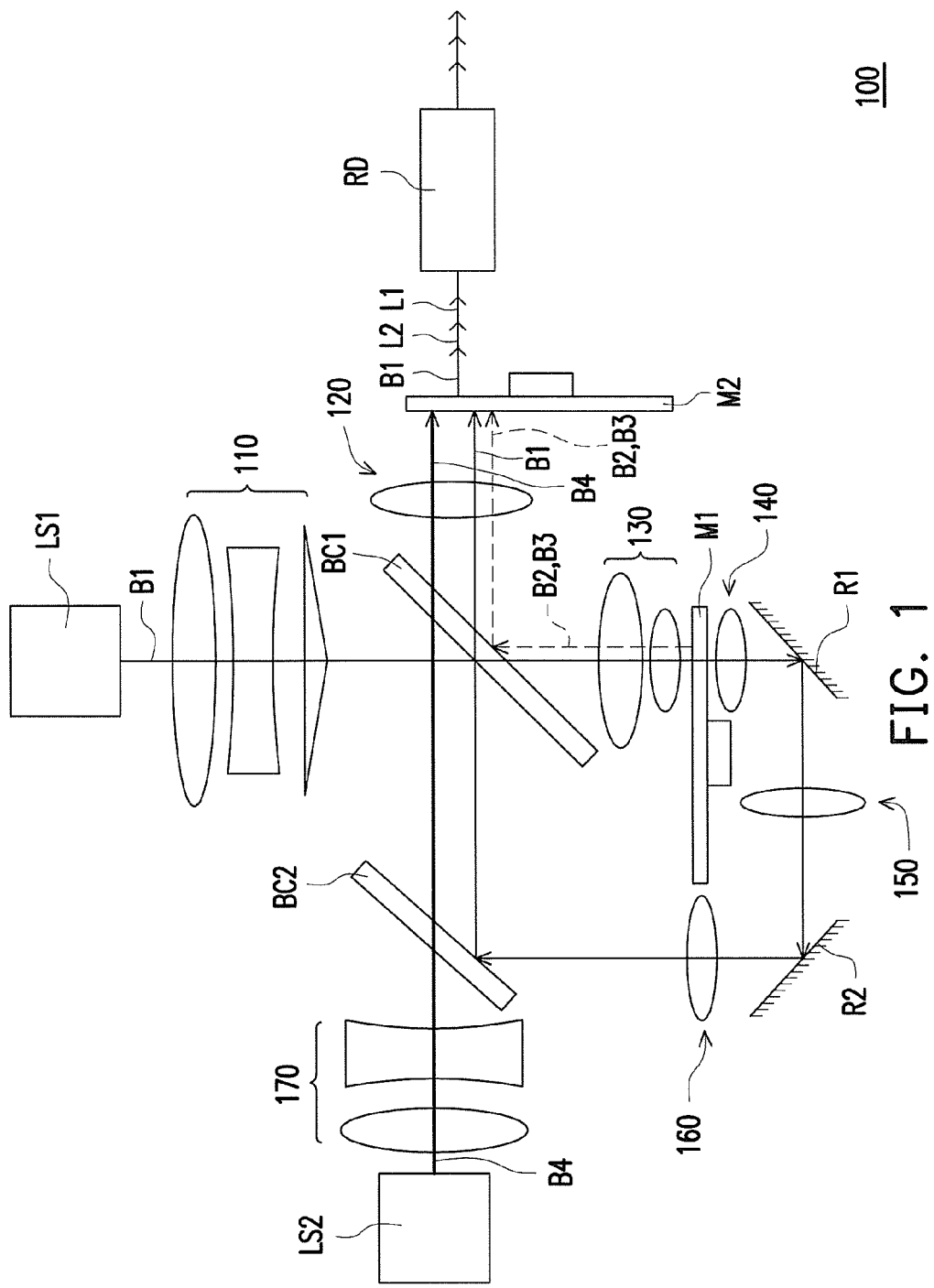
FIG. 1 is a schematic view illustrating an illumination system according to a first embodiment of the invention.
Figure 2:
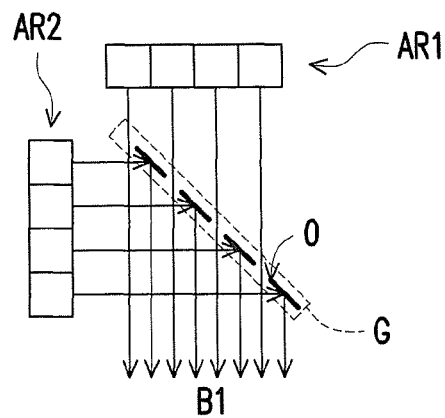
FIG. 2 is another type implementing a coherent light source depicted in FIG. 1.
Figure 3:
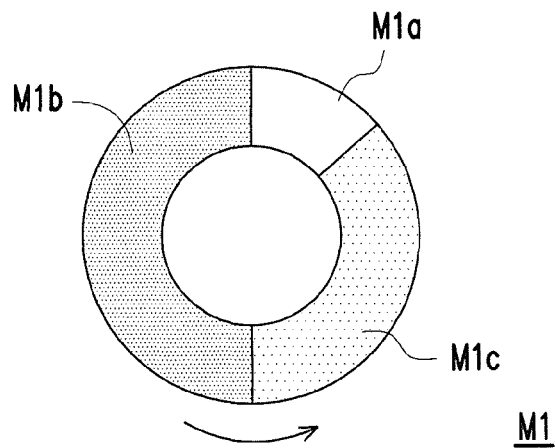
FIG. 3 is a top view illustrating a light wavelength conversion module depicted in FIG. 1.
Figure 4:
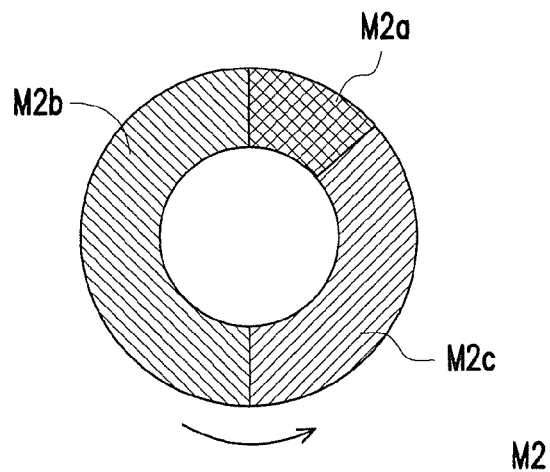
FIG. 4 is a top view illustrating a filtering module depicted in FIG. 1.

FIG. 1 is a schematic view illustrating an illumination system according to a first embodiment of the invention. FIG. 2 is another type implementing a coherent light source depicted in FIG. 1. FIG. 3 is a top view illustrating a light wavelength conversion module depicted in FIG. 1. FIG. 4 is a top view illustrating a light wavelength conversion module depicted in FIG. 1. With reference to FIG. 1 to FIG. 4, an illumination system 100 includes a coherent light source LS1, a first light-combining element BC1, an optical wavelength conversion module M1, and a first auxiliary light source LS2.

The coherent light source LS1 is adapted to emit a coherent light beam B1. The coherent light source LS1 of the embodiment, for example, is a laser light source, the coherent light beam B1, for example, is a laser light beam, and a color of the laser light beam, for example, is blue; however, the invention is not limited thereto. In addition, the coherent light source LS1 may be an array arranged by a plurality of laser diodes, which is sufficient enough to generate a high light output power and has an advantage of capable of dynamically adjusting numbers of light sources (numbers of the laser diodes) to be adapted to be applied to various projection apparatuses with different brightness requirements.

In another embodiment, as shown in FIG. 2, the coherent light source LS1 may also include a first array AR1, a second array AR2, and an optical grating G, wherein the optical grating G includes a plurality of openings O which are arranged at spaced interval. The first array AR1 and the second array AR2, for example, are arranged by the plurality of laser diodes, wherein the laser diodes of the first array AR1 are disposed at one side of the optical grating G, and are adapted to emit the coherent light beams B1 toward openings O of the optical grating G, such that the coherent light beams B1 emitted from the first array AR1 correspondingly pass through the openings O. On another aspect, the laser diodes of the second array AR2 are disposed at another side of the optical grating G, and are adapted to emit the coherent light beams B1 toward an area other than the openings O of the optical grating G. The coherent light beams B1 emitted from the second array AR2 are reflected by the optical grating G and then transmitted along a transmitting direction of the coherent light beams B1 passing through the openings O. Consequently, density of the coherent light beams B1 transmitted to the first light-combining element BC1 (shown in FIG. 1) is effectively increased.

Next, with reference to FIG. 1 to FIG. 4, the first light-combining element BC1 is disposed on the transmission path of the coherent light beams B1 and located between the coherent light source LS1 and the optical wavelength conversion module M1. The first light-combining element BC1 allows a light beam with a specific light wavelength to pass through and reflects a light beam with the other specific wavelength (details are further illustrated later), and the first light-combining element BC1 of the embodiment allows the coherent light beam B1 emitted from the coherent light source LS1 to pass through. For example, the first light-combining element BC1 may be a dichroic mirror, a dichroic filter, or an X-cube prism.

The optical wavelength conversion module M1 is disposed on the transmission path of the coherent light beam B1 transmitted from the first light-combining element BC1, and the optical wavelength conversion module M1 has a rotating shaft (not marked) and is rotated around a central axis of the rotating shaft. The central axis of the rotating shaft of the optical wavelength conversion module M1 is parallel to the transmitting direction of the coherent light beam B1. The optical wavelength conversion module M1, for example, includes a light passing-through area M1a and a first wavelength conversion area M1b. In practical applications, the optical wavelength conversion module M1 may further include a second wavelength conversion area M1c to provide more color, wherein the light passing-through area M1a, the first wavelength conversion area M1b and the second wavelength conversion area M1c, for example, are arranged along a circular path rotating around the central axis of the rotating shaft of the optical wavelength conversion module M1, such that when the optical wavelength conversion module M1 rotates, the light passing-through area M1a, the first wavelength conversion area M1b, and the second wavelength conversion area M1c cut into the transmission path of the coherent light beam B1 in turn.

When the coherent light beam B1 passing through the first light-combining element BC1 irradiates the light passing-through area M1a of the optical wavelength conversion module M1, the coherent light beam B1 passes through the light passing-through area M1a. When the coherent light beam B1 passing through the first light-combining element BC1 irradiates the first wavelength conversion area M1b, the first wavelength conversion area M1b converts the coherent light beam B1 into a first converted light beam B2. In addition, when the coherent light beam B1 passing through the first light-combining element BC1 irradiates the second wavelength conversion area M1c, the second wavelength conversion area M1c converts the coherent light beam B1 into a second converted light beam B3, wherein the first converted light beam B2 and the second converted light beam B3, for example, are reflected back to the first light-combining element BC1 along the same path. However, the invention is not limited thereto. Furthermore, a wavelength of the first converted light beam B2 is different from a wavelength of the second converted light beam B3, and the wavelengths of the first converted light beam B2 and the second converted light beam B3 are different from a wavelength of the coherent light beam B1. For example, colors of the first converted light beam B2 and the second converted light beam B3 are yellow and green, respectively, but the invention is not limited thereto.

The first wavelength conversion area M1b and the second wavelength conversion area M1c may be provided with a phosphor layer or a quantum dot layer, respectively, to correspondingly convert the coherent light beam B1 into the first converted light beam B2 and the second converted light beam B3. For example, in the embodiment, the first wavelength conversion area M1b is provided with a yellow phosphor layer to convert the blue coherent light beam B1 into the yellow first converted light beam B2, while the second wavelength conversion area M1c is provided with a green phosphor layer to convert the blue coherent light beam B1 into the green second converted light beam B3; however, the invention is not limited thereto. Moreover, the optical wavelength conversion module M1 may further include a carrier plate (not shown) to carry the phosphor layers or the quantum dot layers. The carrier plate may be a light reflection carrier plate or a transparent carrier plate. When the optical wavelength conversion module M1 uses the light reflection carrier plate, the light reflection carrier plate may be made of metals, alloys or a combination thereof, and may form the light passing-through area M1a in a way of hollowing the light reflection carrier plate for allowing the coherent light beam B1 to passing through the light passing-through area M1a, and the light reflection carrier plate reflects the first converted light beam B2 and the second converted light beam B3 back to the first light-combining element BC1. Additionally, a hollowed light passing-through area M1a may be provided with transparent diffusion sheet, filled with the transparent materials having a surface having diffusion structure or filled with the transparent materials containing scattering particles for producing effects of diffusing the coherent light beam B1 passing through the light passing-through area M1a, thereby reducing speckle degrees of the coherent light beam B1, and thereby minimizing speckle noises of the illumination system 100. On another aspect, when the optical wavelength conversion module M1 uses a transmissive carrier plate, the optical wavelength conversion module M1 may further arrange a light reflection element on the first wavelength conversion area M1b and the second wavelength conversion area M1c and arrange the light reflection element between the phosphor layers (or the quantum dot layers) and the carrier plate to reflect the first converted light beam B2 and the second converted light beam B3 back to the first light-combining element BC1, and may produce effects of diffusing the coherent light beam B1 passing through the light passing-through area M1a by arranging the scattering structure on a surface of the carrier or arranging the scattering particles within the carrier. Therefore, the speckle degrees of the coherent light beam B1 is reduced, and the speckle noises of the illumination system 100 is minimized. It should be noted that an arrangement or a design parameter such as an area ratio of the light passing-through area M1a, the first wavelength conversion area M1b, and the second wavelength conversion area M1c may be determined based on requirements of actual designs. The optical wavelength conversion module M1 of the invention is not limited to the type as shown in FIG. 3.

The illumination system 100 may further includes a light transmission module disposed on the transmission path of the coherent light beam B1 transmitted from the optical wavelength conversion module M1 to transmit the coherent light beam B1 passing through the light passing-through area M1a back to the first light-combining element BC1. The optical transmission module of the embodiment includes two reflecting mirrors R1 and R2 configured for changing the transmitting direction of the coherent light beam B1, wherein the reflecting mirror R1 is disposed between the optical wavelength conversion module M1 and the reflecting mirror R2, but numbers of elements, varieties and arrangements of the optical wavelength conversion module are not limited in the invention.

The first auxiliary light source LS2 is adapted to emit a first auxiliary light beam B4, wherein a wavelength of the first auxiliary light beam B4 is different from the wavelength of the coherent light beam B1 to enhance purity and brightness of specific color lights other than the color of the coherent light beam B1 of the illumination system 100. For example, the first auxiliary light source LS2 may be set to be turned on during at least a period when the first wavelength conversion area M1b cuts into the transmission path of the coherent light beam B1, such that the first auxiliary light beam B4 and the first converted light beam B2 transmitted to the first light-combining element BC1 are mixed, and thereby enhancing purity, brightness and a color rendering property of specific light colors. In the embodiment, the first auxiliary light source LS2, for example, is a red light source, and the first auxiliary light source LS2 is set to be turn on during a period when the first wavelength conversion area M1b cuts into the transmission path of the coherent light beam B1 so as to enhance purity and brightness of a red light of the illumination system 100, but the invention is not limited thereto. The color of the first auxiliary light beam B4 (or a light wavelength spectrum range thereof) and a turn-on time for the first auxiliary light source LS2 may be determined based on requirements.

In addition, the first auxiliary light source LS2 may include at least one light emitting diode (LED) or at least one laser diode, and numbers of the light emitting diode (LED) or the laser diode may be one or more. When the first auxiliary light source LS2 is the light emitting diode (LED), the first auxiliary light beam B4 is a visible light beam; and when the first auxiliary light source LS2 is the laser diode, the first auxiliary light beam B4 is a laser light beam.

The first auxiliary light beam B4 of the embodiment, for example, is transmitted to the first light-combining element BC1 along the transmission path of the coherent light beam B1 from the light passing-through area M1a. More specifically, the illumination system 100 further includes a second light-combining element BC2. The second light-combining element BC2 may be a dichroic mirror, a dichroic filter, or an X-cube prism. The second light-combining element BC2 is disposed on a transmission path of the first auxiliary light beam B4 and the transmission path of the coherent light beam B1 transmitted from the optical wavelength conversion module M1, and disposed between the first auxiliary light source LS2 and the first light-combining element BC1, such that the coherent light beam B1 from the light passing-through area M1a is transmitted to the first light-combining element BC1 sequentially through the light transmission module (including the reflecting mirrors R1 and R2) and the second light-combining element BC2, and the first auxiliary light beam B4 is transmitted to the first light-combining element BC1 through the second light-combining element BC2. The first light-combining element BC1 then combines the first auxiliary light beam B4 and the first converted light beam B2 reflected from the optical wavelength conversion module M1. In other words, the first converted light beam B2 reflected back to the first light-combining element BC1 by the optical wavelength conversion module M1 is reflected by the first light-combining element BC1, and thereby is transmitted along the transmission path of the first auxiliary light beam B4 passing through the first light-combining element BC1.

As shown in FIG. 1, the first light-combining element BC1 is adapted to reflect the first converted light beam B2 and the second converted light beam B3 from the optical wavelength conversion module M1, and allows the first auxiliary light beam B4 and the coherent light beam B1 to pass through. On another aspect, the second light-combining element BC2 is adapted to reflect the coherent light beam B1 transmitted from the optical wavelength conversion module M1 and allows the first auxiliary light beam B4 to pass through. In the embodiment, the coherent light source LS1 is a blue light source, the first auxiliary light source LS2 is a red light source, and colors of the first converted light beam B2 and the second converted light beam B3 are yellow and green, respectively. Therefore, the first light-combining element BC1 may be designed to be adapted to reflect a light beam having a wavelength ranging from 460 nm to 630 nm, and allow a light beam having a wavelength less than 460 nm or more than 630 nm to pass through. On another aspect, the second light-combining element BC2 may be designed to be adapted to reflect a light beam having a wavelength less than or equal to 460 nm, and allow a light beam having a wavelength more than 460 nm to pass through. Furthermore, a light wavelength spectrum range of the coherent light beam B1 is at least partially less than or equal to 460 nm, and preferably less than 460 nm, to increase a ratio of the coherent light beam B1 passing through the first light-combining element BC1 and a ratio of the coherent light beam B1 reflected by the second light-combining element BC2. Moreover, a light wavelength spectrum range of the first auxiliary light beam B4 is at least partially more than 630 nm, and preferably more than 630 nm, to increase ratios of the first auxiliary light beam B4 passing through the first light-combining element BC1 and the second light-combining element BC2.

The reflecting mirror R2 in FIG. 1 is disposed between the second light-combining element BC2 and the reflecting mirror R1, but the invention is not limited thereto. In another embodiment, the second light-combining element BC2 may also be disposed between the reflecting mirror R1 and the reflecting mirror R2, and located between the first auxiliary light source LS2 and the reflecting mirror R1.

In order to provide a light beam having better color purity, the illumination system 100 may further include a filtering module M2 disposed on the transmission paths of the first converted light beam B2, the second converted light beam B3, the first auxiliary light beam B4, and the coherent light beam B1 from the first light-combining element BC1. The filtering module M2, for example, is divided into areas in correspondence with the optical wavelength conversion module M1. As shown in FIG. 4, the filtering module M2, for example, includes a light pervious area M2a, a first filtering area M2b, and a second filtering area M2c.

The light pervious area M2a of the filtering module M2 cuts into the transmission path of the coherent light beam B1 passing through the light passing-through area M1a corresponding to the light passing-through area M1a of the optical wavelength conversion module M1, and the coherent light beam B1 passes through the light pervious area M2a. The first filtering area M2b of the filtering module M2 cuts into the transmission paths of the first converted light beam B2 and the first auxiliary light beam B4 corresponding to the first wavelength conversion area M1b of the optical wavelength conversion module M1, and the first filtering area M2b filters the first converted light beam B2 and the first auxiliary light beam B4 to generate a first light beam L1. The second filtering area M2c of the filtering module M2 cuts into the transmission path of the second converted light beam B3 corresponding to the second wavelength conversion area M1c of the optical wavelength conversion module M1, and the second filtering area M2c filters the second converted light beam B3 to generate a second light beam L2, wherein a light wavelength spectrum range of the second light beam L2 is narrower than a light wavelength spectrum range of the second converted light beam B3, and a light wavelength spectrum range of the first light beam L1 is narrower than a light wavelength spectrum range of the first converted light beam B2, so as to enhance purity of colors.

In the embodiment, the filtering module M2, for example, is a color wheel having a rotating shaft (not numbered) and rotating around a central axis of the rotating shaft, such that the light pervious area M2a, the first filtering area M2b, and the second filtering area M2c of the filtering module M2 sequentially cut into a transmission path of a corresponding light beam corresponding to the light passing-through area M1a, the first wavelength conversion area M1ba, and the second wavelength conversion area M1c of the optical wavelength conversion module M1 respectively, wherein the light pervious area M2a is provided with a diffusion sheet to minimize the speckle noises of the illumination system 100. Besides, the first filtering area M2b and the second filtering area M2c are respectively provided with the filtering sheets to filter a partial spectrum of the corresponding converted light beams, such that purity of each pure color light emitted from the illumination system 100 may be effectively enhanced. For example, the first filtering area M2b provided with a red filtering sheet allows the first converted light beam B2 and the first auxiliary light beam B4 to pass through, and filters the first converted light beam B2 and the first auxiliary light beam B4 to generate the red first light beam L1 with high color purity; and the second filtering area M2c provided with a green filtering sheet allows the second converted light beam B3 to pass through, and filters the second converted light beam B3 to generate the green second light beam L2 with high color purity.

Since intensity of the first light beam L1 is directly proportional to a ratio of the first converted light beam B2 and the first auxiliary light beam B4 passing through the first filtering area M2b, the light wavelength spectrum range of the first converted light beam B2 is at least partially overlapped with the light wavelength spectrum range of the first light beam L1, and the light wavelength spectrum range of the first auxiliary light beam B4 is at least partially overlapped with the light wavelength spectrum range of the first light beam L1, so as to reduce a ratio of the first converted light beam B2 and the first auxiliary light beam B4 being filtered by the first filtering area M2b of the filtering module M2. The light wavelength spectrum range of the first auxiliary light beam B4 may be at least partially overlapped with the light wavelength spectrum range of the first converted light beam B2, or the light wavelength spectrum range of the first auxiliary light beam B4 may be proximate to but not overlapped with the light wavelength spectrum range of the first converted light beam B2.

In the embodiment, the light pervious area M2a is not provided with a filtering sheet. Accordingly, in order to prevent blue color shift caused by the first auxiliary light beam B4 passing through the light pervious area M2a due to the first auxiliary light source LS2 being turned on continuously from occurring, the first auxiliary light source LS2 is set to be turned on only during a period when the first wavelength conversion area M1b cuts into the transmission path of the coherent light beam B1, and to be turned off during periods when the light passing-through area M1a and the second wavelength conversion area M1c cut into the transmission path of the coherent light beam B1, such that the first auxiliary light beam B4 only combines with the first converted light beam B2 at the first light-combining element BC1 prior to mixture. Further, color purity, brightness and a color rendering property and so forth of the first light beam L1 generated from the first auxiliary light beam B4 and the first converted light beam B2 are effectively enhanced. Nevertheless, the invention is not limited thereto. In another embodiment, the light pervious area M2a may be provided with a blue filtering sheet. Accordingly, even if the first auxiliary light source LS2 is continuously turned on during the periods when the light passing-through area M1a and the second wavelength conversion area M1c cut into the transmission path of the coherent light beam B1, the filtering sheets located on the light pervious area M2a and the second filtering area M2c may filter the first auxiliary light beam B4, such that color shift may be prevented. Namely, under a structure of providing a filtering sheet on the light pervious area M2a, the first auxiliary light source LS2 may be turned on continuously.

In addition, the illumination system 100 of the embodiment may further include a light uniform device RD disposed on the transmission paths of the coherent light beam B1, the first light beam L1 and the second light beam L2 from the filtering module M2. The light uniform device RD, for example, is an optical integration rod or a lens array (not shown). The optical integration rod may a hollow integration rod which is consisted of a plurality of reflecting minors or a solid integration rod for improving uniformity of laser by using multiple reflections. Furthermore, the illumination system 100 of the embodiment may also be provided with lens sets 110, 120, 130, 140, 150, 160, and 170 on the transmission paths of the coherent light beam B1 and the first auxiliary light beam B4, wherein each of the lens sets 110, 120, 130, 140, 150, 160, and 170 may include at least one lens for converging lights, but the invention is not limited thereto.

In the embodiment, the first auxiliary light beam B4 and the first converted light beam B2 are mixed before being transmitted to the filtering module M2, so that a related arrangement of the first light-combining element BC1, the filtering module M2, and a device located after a light path of the filtering module M2 (such as the light uniform device RD) of the embodiment does not need to be changed. In other words, in the embodiment, purity and brightness of a color light beam in the illumination system 100 are enhanced with an arrangement of the first auxiliary light source LS2 without drastically changing a structure of an illumination system. Moreover, since brightness of specific colors is enhanced without adjusting the area ratio of the light passing-through area M1a, the first wavelength conversion area M1b, and the second wavelength conversion area M1c on the optical wavelength conversion module M1 in the embodiment, color shifts or insufficient brightness of partial colors may be avoided.

Although the above embodiment is provided with the first auxiliary light source LS2 as a red light source, but the invention is not limited thereto. In another embodiment, the first auxiliary light source LS2 may also be a green light source. Accordingly, positions of the phosphor layers or the quantum dot layers on the first wavelength conversion area M1b and the second wavelength conversion area M1c need to be interchanged, such that colors of the first converted light beam B2 and the second converted light beam B3 are green and yellow, respectively. In addition, positions of the filtering sheets of the first filtering area M2b and the second filtering area M2c also need to be interchanged, such that a color of the first light beam L1 is green, and a color of the second light beam L2 is red. Furthermore, the first light-combining element BC1, for example, may be designed to be adapted to reflect a light beam having a wavelength ranging from 460 nm to 545 nm or a light beam having a wavelength larger than 555 nm, and to allow a light beam having a wavelength ranging from 545 nm to 555 nm or a light beam having a wavelength less than 460 nm to pass through. On another aspect, the second light-combining element BC2 may be designed to be adapted to reflect a light beam having a wavelength less than or equal to 460 nm, and to allow a light beam having a wavelength more than 460 nm to pass through.

Figure 5:
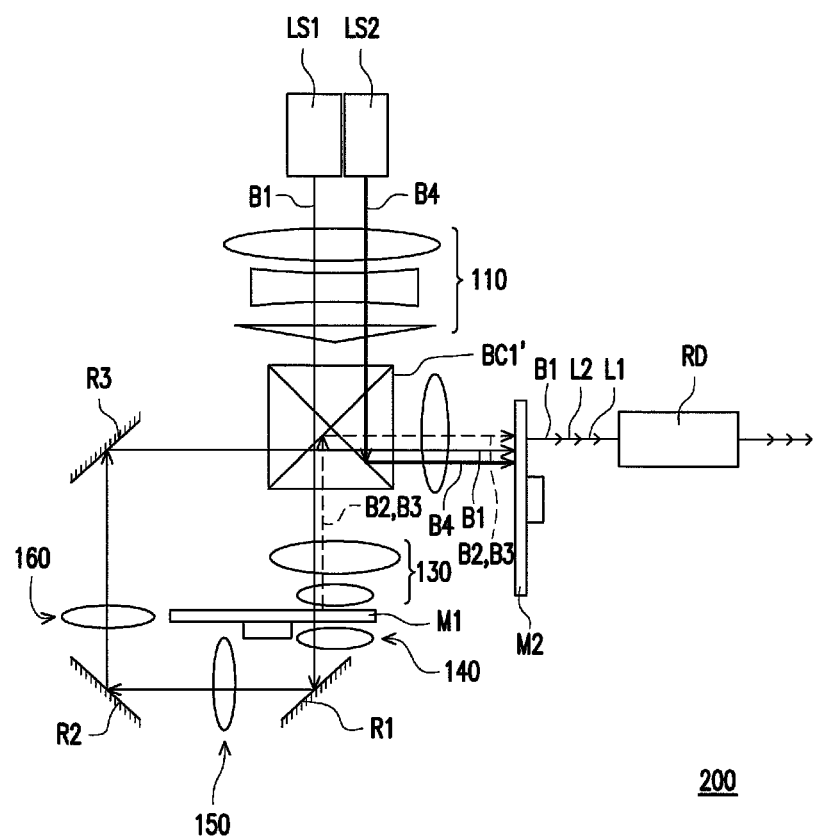
FIG. 5 is a schematic view illustrating an illumination system according to a second embodiment of the invention.

FIG. 5 is a schematic view illustrating an illumination system according to a second embodiment of the invention. With reference to FIG. 5, an illumination system 200 of the embodiment is substantially the same as the illumination system 100 of FIG. 1, and the same components are represented by the same reference numbers, which are not reiterated hereinafter. The primary difference between two illumination systems lies in that the first auxiliary light beam B4 emitted from the first auxiliary light source LS2 of the embodiment is transmitted to a first light-combining element BC1' along the transmission path of the coherent light beam B1 emitted from the coherent light source LS1.

More specifically, the coherent light source LS1 and the first auxiliary light source LS2 of the embodiment are located at the same side of the first light-combining element BC1', and the coherent light beam B1 from the coherent light source LS1 and the first auxiliary light beam B4 from the first auxiliary light source LS2 are incident to the same surface of the first light-combining element BC1'. In addition, the first light-combining element BC1', for example, is a prism having a light splitting and a light combining functions to transmit the first auxiliary light beam B4 toward the filtering module M2, and allow the coherent light beam B1 to pass through. Furthermore, since the first auxiliary light beam B4 is directly incident into the first light-combining element BC1' and mixed with the first converted light beam B2, the arrangement of the second light-combining element BC2 in FIG. 1 may be omitted in the embodiment, and the light transmission module may further include a reflecting mirror R3 disposed at the position of the second light-combining element BC2 in FIG. 1 to transmit the coherent light beam B1 passing through the optical wavelength conversion module M1 back to the first light-combining element BC1'.

Figure 6:
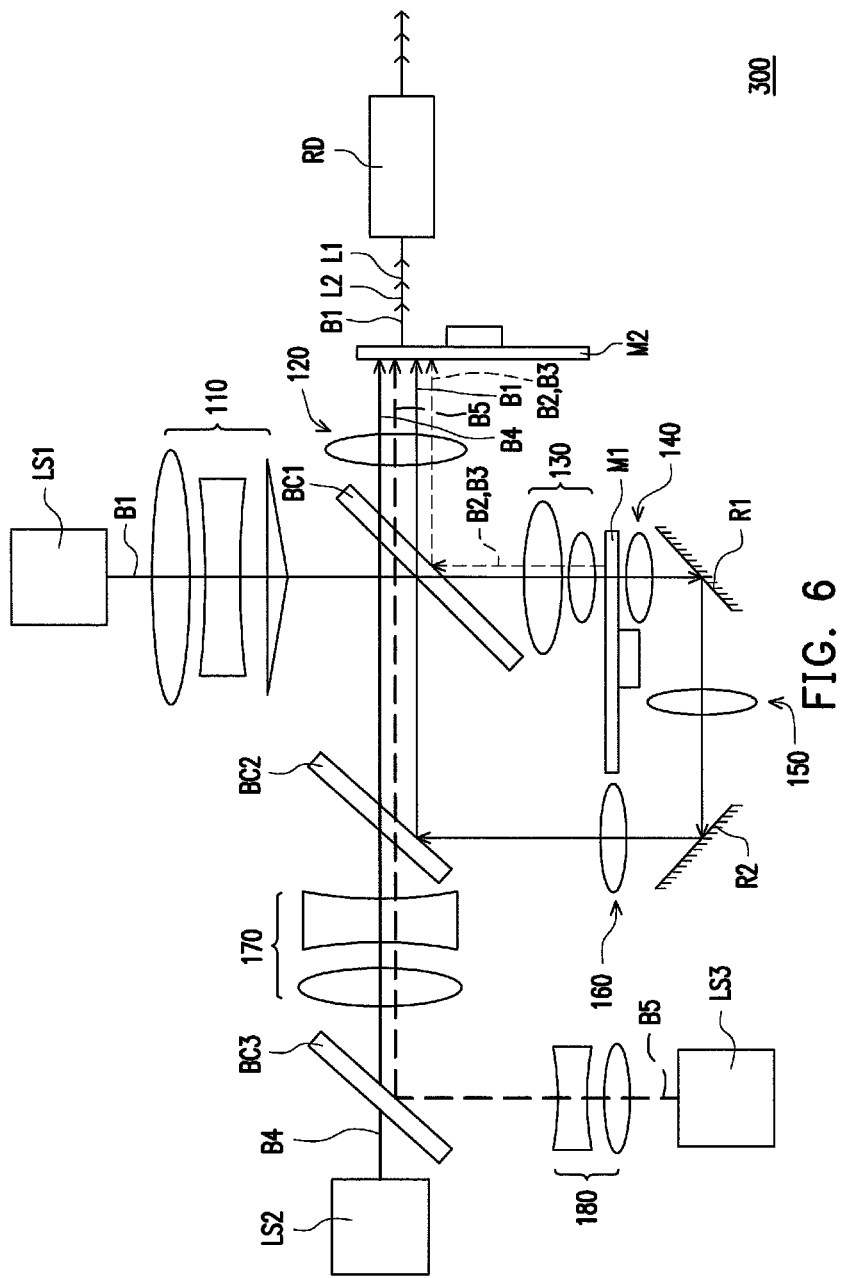
FIG. 6 is a schematic view illustrating an illumination system according to a third embodiment of the invention.

FIG. 6 is a schematic view illustrating an illumination system according to a third embodiment of the invention.

With reference to FIG. 6, an illumination system 300 of the embodiment is substantially the same as the illumination system 100 of FIG. 1, and the same components are represented by the same reference numbers, which are not reiterated hereinafter. The primary difference between two illumination systems lies in that the illumination system 300 of the embodiment further includes a second auxiliary light source LS3 and a third light-combining element BC3. The second auxiliary light source LS3 is adapted to emit a second auxiliary light beam B5, wherein a wavelength of the second auxiliary light beam B5 is different from the wavelengths of the coherent light beam B1 and the first auxiliary light beam B4. In the embodiment, the second auxiliary light source LS3, for example, is configured for enhancing color purity, brightness and a color rendering property of the second light beam L2 emitted from the second filtering area M2c (with reference to FIG. 4). For example, the second auxiliary light source LS3 is a green light source, and the second auxiliary light source LS3 may include at least one light emitting diode (LED) or at least one laser diode, and numbers of the light emitting diode (LED) or the laser diode may be one or more.

The third light-combining element BC3 is disposed on the transmission path of the first auxiliary light beam B4 and a transmission path of the second auxiliary light beam B5, and the third light-combining element BC3 is disposed between the second auxiliary light source LS3 and the second light-combining element BC2, wherein the first auxiliary light beam B4 from the first auxiliary light source LS2 and the second auxiliary light beam B5 from the second auxiliary light source LS3 are respectively transmitted to the first light-combining element BC1 through the third light-combining element BC3 and the second light-combining element BC2 in sequence, and the first auxiliary light beam B4 and the second auxiliary light beam B5 are transmitted to the first light-combining element BC1 along the transmission path of the coherent light beam B1 from the light passing-through area M1a (with reference to FIG. 3). In addition, the first light-combining element BC1 combines the first auxiliary light beam B4 and the first converted light beam B2 reflected from the optical wavelength conversion module M1, and combines the second auxiliary light beam B5 and the second converted light beam B3 reflected from the optical wavelength conversion module M1.

When the first filtering area M2b cuts into the transmission paths of the first converted light beam B2 and the first auxiliary light beam B4 corresponding to the first wavelength conversion area M1b of the optical wavelength conversion module M1, the first filtering area M2b filters the first converted light beam B2 and the first auxiliary light beam B4 to generate the first light beam L1, wherein the light wavelength spectrum range of the first light beam L1 is narrower than the light wavelength spectrum range of the first converted light beam B2. On another aspect, when the second filtering area M2b cuts into the transmission paths of the second converted light beam B3 and the second auxiliary light beam B5 corresponding to the second wavelength conversion area M1c of the optical wavelength conversion module M1, the second filtering area M2c filters the second converted light beam B3 and the second auxiliary light beam B5 to generate the second light beam L2, wherein the light wavelength spectrum range of the second light beam L2 is narrower than the light wavelength spectrum range of the second converted light beam B3. Whether the first auxiliary light source LS2 and the second auxiliary light source LS3 are continuously turned on or are only turned on when the corresponding filtering area moves to the transmission path of the corresponding light beam depends on whether the light pervious area M2a of the filtering module M2 is provided with a filtering sheet. This part of the content may be referred to the above description and is not reiterated hereinafter.

As shown in FIG. 6, the third light-combining element BC3 is adapted to reflect the second auxiliary light beam B5 from the second auxiliary light source LS3, and allow the first auxiliary light beam B4 to pass through. The second light-combining element BC2 is adapted to reflect the coherent light beam B1 passing through the optical wavelength conversion module M1, and allow the first auxiliary light beam B4 and the second auxiliary light beam B5 to pass through. The first light-combining element BC1 is adapted to reflect the first converted light beam B2 and the second converted light beam B3 reflected from the optical wavelength conversion module M1, and allow the first auxiliary light beam B4, the second auxiliary light beam B5, and the coherent light beam B1 to pass through. Therefore, the first light-combining element BC1 may be designed to be adapted to reflect a light beam having a wavelength ranging from 460 nm to 545 nm and a light beam having a wavelength ranging from 555 nm to 630 nm, and allow light beams having a wavelength less than 460 nm, ranging from 545 nm to 555 nm, or more than 630 nm to pass through. On another aspect, the second light-combining element BC2 may be designed to be adapted to reflect a light beam having a wavelength less than or equal to 460 nm, and allow a light beam having a wavelength more than 460 nm to pass through; and the third light-combining element BC3 may be designed to be adapted to reflect a light beam having a wavelength less than 630 nm, and allow a light beam having a wavelength more than or equal to 630 nm to pass through.

Furthermore, the illumination system 300 of the embodiment may also be provided with a lens set 180 disposed on the transmission path of the second auxiliary light beam B5, and located between the second auxiliary light source LS3 and the third light-combining element BC3, wherein the lens set 180 may include at least one lens for converging lights, but the invention is not limited thereto.

Figure 7:
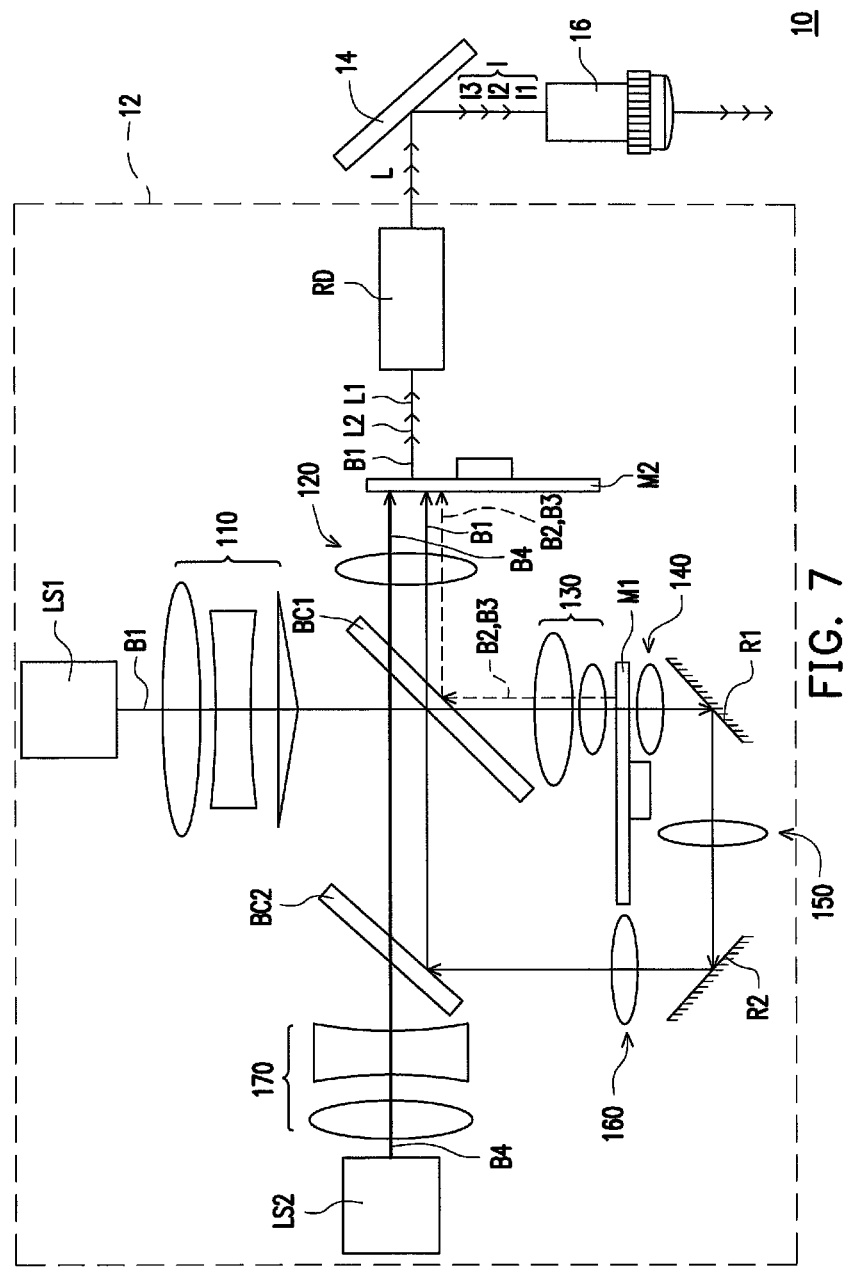
FIG. 7 is a schematic view illustrating a projection apparatus according to a first embodiment of the invention.

FIG. 7 is a schematic view illustrating a projection apparatus according to a first embodiment of the invention. With reference to FIG. 7, a projection apparatus 10 includes an illumination system 12, a light valve 14, and a projection lens 16. The illumination system 12 may be one of the illumination systems 100, 200, and 300 of FIG. 1, FIG. 5 and FIG. 6 illustrated in the embodiments. The optical arrangement of the illumination system 100 is taken as an example to illustrate the illumination system 12 of the embodiment, but the invention is not limited thereto. The light valve 14 is disposed on a transmission path of an illumination beam L from the illumination system 12 (i.e., the illumination system 100 of FIG. 1) to convert the illumination beam L into an image light beam I, wherein the illumination beam L is formed from the first converted light beam B2 and the first auxiliary light beam B4. More particularly, the illumination beam L is formed from the coherent light beam B1, the first converted light beam B2, the second converted light beam B3 and the first auxiliary light beam B4. Accordingly the illumination beam L of the embodiment includes the first light beam L1, the second light beam L2, and the coherent light beam B1.

The light valve 14, for example, is a digital micro-mirror device (DMD), a liquid-crystal-on-silicon panel, a transmission liquid crystal panel, or other appropriate spatial light modulators (SLMs), and is adapted to convert the first light beam L1, the second light beam L2, and the coherent light beam B1 of the illumination beam L into a first image light beam I1, a second image light beam I2, and a third image light beam I3, wherein a transmission path of the first image light beam I1, a transmission path of the second image light beam I2, and a transmission path of the third image light beam I3 are substantially coincided. The projection lens 16 is disposed on the transmission path of the image light beam I, and configured to project the first image light beam I1, the second image light beam I2, and the third image light beam I3 to a screen or other objects configured for forming images. In the embodiment, the light valve 14 is illustrated by taking a digital micro-mirror device (DMD) as an example. The first image light beam I1, the second image light beam I2, and the third image light beam I3, for example, are respectively a red image light beam, a green image light beam, and a blue image light beam. When these image light beams are projected in high frequency to a screen in turn, users may see color images on the screen by a vision persistence theory. If the light valve 14 are three transmission liquid crystal panels, then the images light beams are projected to the screen in another manner (not reiterated herein) for users to view color images.

In view of the foregoing, the embodiments of the invention may achieve at least one of the following advantages or effects. The illumination system illustrated in the above embodiment and the projection apparatus employing the illumination system in the invention may provide enhanced purity and brightness of at least a color light beam with an arrangement of at least an auxiliary light source. In addition, since the above embodiments of the invention can enhance brightness of specific colors without adjusting a ratio between the areas in the optical wavelength conversion module, color shifts or insufficient brightness of partial color lights may be avoided.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. In addition, any of the embodiments or any of the claims of the invention does not need to achieve all of the advantages or features disclosed by the invention. Furthermore, the abstract and the headings are merely used to aid in searches of patent files and are not intended to limit the scope of the claims of the invention. Moreover, it should be known that the terminology used in the disclosure adopts "the first", "the second" and "the third" to describe each of the components, regions, layers and/or portions, but such terminology should not limit the components, regions, layers and/or portions.

What is claimed is:

1. An illumination system, comprising:
    a coherent light source adapted to emit a coherent light beam;
    a first light-combining element disposed on a transmission path of the coherent light beam;
    an optical wavelength conversion module disposed on the transmission path of the coherent light beam transmitted from the first light-combining element, the optical wavelength conversion module including a light passing-through area and a first wavelength conversion area, the light passing-through area and the first wavelength conversion area cutting into the transmission path of the coherent light beam in turn, the first light-combining element located between the coherent light source and the optical wavelength conversion module, wherein when the coherent light beam irradiates the first wavelength conversion area, the first wavelength conversion area of the optical wavelength conversion module converts the coherent light beam into a first converted light beam and reflects the first converted light beam back to the first light-combining element, and a wavelength of the first converted light beam is different from a wavelength of the coherent light beam;
    a first auxiliary light source adapted to emit a first auxiliary light beam, a wavelength of the first auxiliary light beam is different from the wavelength of the coherent light beam, wherein the first auxiliary light beam is transmitted to the first light-combining element, and the first light-combining element combines the first auxiliary light beam and the first converted light beam reflected from the optical wavelength conversion module, wherein the first auxiliary light source is set to be turned on during a period when the coherent light beam irradiates the first wavelength conversion area of the optical wavelength conversion module so that the first auxiliary light beam is combined with the first converted light beam reflected from the optical wavelength conversion module through the first light-combining element, wherein when the first auxiliary light source is turned on, the first auxiliary light beam is transmitted to the first light-combining element to be combined with the first converted light beam, and a transmitting direction of the first auxiliary light beam is different from a transmitting direction of the first converted light beam before the first auxiliary light beam and the first converted light beam are being combined; and
    a filtering module, adapted to filter the combined first converted light beam and the first auxiliary light beam to generate a first light beam, and a light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining element without being transmitted to the optical wavelength conversion module.

2. The illumination system as claimed in claim 1, wherein when the coherent light beam irradiates the light passing-through area, the coherent light beam passes through the light passing-through area, the illumination system further comprises a light transmission module disposed on the transmission path of the coherent light beam passing through the optical wavelength conversion module to transmit the coherent light beam from the light passing-through area back to the first light-combining element.

3. The illumination system as claimed in claim 2, further comprising:
    the filtering module disposed on transmission paths of the first converted light beam, the first auxiliary light beam and the coherent light beam transmitted from the first light-combining element, the filtering module comprising a light pervious area and a first filtering area, the light pervious area cutting into the transmission path of the coherent light beam passing through the light passing-through area corresponding to the light passing-through area of the optical wavelength conversion module, and the coherent light beam passing through the light pervious area, the first filtering area corresponding to the first wavelength conversion area of the optical conversion module, the first filtering area cutting into the transmission paths of the first converted light beam and the first auxiliary light beam, wherein the first filtering area filters the first converted light beam and the first auxiliary light beam to generate the first light beam, a light wavelength spectrum range of the first light beam is narrower than a light wavelength spectrum range of the first converted light beam.

4. The illumination system as claimed in claim 2, further comprising:
  a second light-combining element disposed on a transmission path of the first auxiliary light beam and the transmission path of the coherent light beam passing through the optical wavelength conversion module, and the second light-combining element disposed between the first auxiliary light source and the first light-combining element, wherein the coherent light beam from the light passing-through area is transmitted to the first light-combining element through the light transmission module and the second light-combining element, and the first auxiliary light beam is transmitted to the first light-combining element along the transmission path of the coherent light beam from the light passing-through area.

5. The illumination system as claimed in claim 4, further comprising:
  a second auxiliary light source adapted to emit a second auxiliary light beam, a wavelength of the second auxiliary light beam is different from the wavelengths of the coherent light beam and the first auxiliary light beam; and
  a third light-combining element disposed on the transmission path of the first auxiliary light beam and a transmission path of the second auxiliary light beam, and the third light-combining element disposed between the second auxiliary light source and the first light-combining element, wherein the first auxiliary light beam from the first auxiliary light source and the second auxiliary light beam from the second auxiliary light source are transmitted to the first light-combining element through the third light-combining element and the second light-combining element, and the first auxiliary light beam and the second auxiliary light beam are transmitted to the first light-combining element along the transmission path of the coherent light beam from the light passing-through area.

6. The illumination system as claimed in claim 5, wherein the optical wavelength conversion module further includes a second wavelength conversion area, and the light passing-through area, the first wavelength conversion area and the second wavelength conversion area cut into the transmission path of the coherent light beam in turn, when the coherent light beam irradiates the second wavelength conversion area, the second wavelength conversion area converts the coherent light beam into a second converted light beam and reflects the second converted light beam back to the first light-combining element, a wavelength of the second converted light beam is different from the wavelength of the coherent light beam, and a light wavelength spectrum range of the second auxiliary light beam is at least partially overlapped with a light wavelength spectrum range of the second converted light beam.

7. The illumination system as claimed in claim 5, wherein the second auxiliary light source is a light emitting diode or a laser diode.

8. The illumination system as claimed in claim 1, wherein the first auxiliary light beam is transmitted to the first light-combining element along the transmission path of the coherent light beam emitted from the coherent light source.

9. The illumination system as claimed in claim 1, wherein a light wavelength spectrum range of the first auxiliary light beam is at least partially overlapped with a light wavelength spectrum range of the first converted light beam, or the light wavelength spectrum range of the first auxiliary light beam is not overlapped with the light wavelength spectrum range of the first converted light beam.

10. The illumination system as claimed in claim 1, wherein the first auxiliary light source comprises at least one light emitting diode or at least one laser diode.

11. The illumination system as claimed in claim 1, further comprising:
  a second auxiliary light source adapted to emit a second auxiliary light beam, a wavelength of the second auxiliary light beam is different from the wavelengths of the coherent light beam and the first auxiliary light beam, wherein the second auxiliary light beam is transmitted to the first light-combining element along the transmission path of the coherent light beam and the first auxiliary light beam, and the first light-combining element combines the first auxiliary light beam, the second auxiliary light beam and the first converted light beam reflected from the optical wavelength conversion module.

12. The illumination system as claimed in claim 1, wherein the optical wavelength conversion module further includes a second conversion area, and the first auxiliary light source is set to be turned on only during a period when the first wavelength conversion area cuts into the transmission path of the coherent light beam, and to be turned off during periods when the light passing-through area and the second wavelength conversion area cut into the transmission path of the coherent light beam.

13. A projection apparatus, comprising:
  an illumination system, comprising:
    a coherent light source adapted to emit a coherent light beam;
    a first light-combining element disposed on a transmission path of the coherent light beam;
    an optical wavelength conversion module disposed on the transmission path of the coherent light beam transmitted from the first light-combining element, the optical wavelength conversion module including a light passing-through area and a first wavelength conversion area, the light passing-through area and the first wavelength conversion area cutting into the transmission path of the coherent light beam in turn, the first light-combining element located between the coherent light source and the optical wavelength conversion module, wherein when the coherent light beam irradiates the first wavelength conversion area, the first wavelength conversion area of the optical wavelength conversion module converts the coherent light beam into a first converted light beam and reflects the first converted light beam back to the first light-combining element, a wavelength of the first converted light beam is different from a wavelength of the coherent light beam;

a first auxiliary light source adapted to emit a first auxiliary light beam, a wavelength of the first auxiliary light beam is different from the wavelength of the coherent light beam, wherein the first auxiliary light beam is transmitted to the first light-combining element, and the first light-combining element combines the first auxiliary light beam and the first converted light beam reflected from the optical wavelength conversion module, wherein the first auxiliary light source is set to be turned on during a period when the coherent light beam irradiates the first wavelength conversion area of the optical wavelength conversion module so that the first auxiliary light beam is combined with the first converted light beam reflected from the optical wavelength conversion module through the first light-combining element, wherein when the first auxiliary light source is turned on, the first auxiliary light beam is transmitted to the first light-combining element to be combined with the first converted light beam, and a transmitting direction of the first auxiliary light beam is different from a transmitting direction of the first converted light beam before the first auxiliary light beam and the first converted light beam are being combined; and a filtering module, adapted to filter the combined first converted light beam and the first auxiliary light beam to generate a first light beam, and a light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining element without being transmitted to the optical wavelength conversion module;

a light valve disposed on a transmission path of an illumination beam from the illumination system to convert the illumination beam into an image light beam, wherein the illumination beam is formed from the first converted light beam and the first auxiliary light beam; and a projection lens disposed on a transmission path of the image light beam.

14. The projection apparatus as claimed in claim 13, wherein when the coherent light beam irradiates the light passing-through area, the coherent light beam passes through the light passing-through area, the illumination system further comprises a light transmission module disposed on the transmission path of the coherent light beam passing through the optical wavelength conversion module to transmit the coherent light beam from the light passing-through area back to the first light-combining element, the illumination beam is further formed from the coherent light beam.

15. The projection apparatus as claimed in claim 13, wherein the optical wavelength conversion module further includes a second conversion area, and the first auxiliary light source is set to be turned on only during a period when the first wavelength conversion area cuts into the transmission path of the coherent light beam, and to be turned off during periods when the light passing-through area and the second wavelength conversion area cut into the transmission path of the coherent light beam.

* * * * *